(12) United States Patent
Kataoka (10) Patent No.: US 10,183,405 B2
(45) Date of Patent: Jan. 22, 2019

(54) ROBOT, GEAR DEVICE, AND MANUFACTURING METHOD FOR GEAR DEVICE

(71) Applicant: Seiko Epson Corporation, Tokyo (JP)

(72) Inventor: Yuya Kataoka, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/711,240

(22) Filed: Sep. 21, 2017

(65) Prior Publication Data

US 2018/0085931 A1    Mar. 29, 2018

(30) Foreign Application Priority Data

Sep. 26, 2016   (JP) .................................. 2016-186602

(51) Int. Cl.
| | |
|---|---|
| *F16H 33/00* | (2006.01) |
| *F16H 35/00* | (2006.01) |
| *F16H 37/00* | (2006.01) |
| *B25J 19/00* | (2006.01) |
| *B23Q 1/26* | (2006.01) |

(52) U.S. Cl.
CPC ............ *B25J 19/0062* (2013.01); *B23Q 1/26* (2013.01)

(58) Field of Classification Search
CPC ............................ B25J 19/0062; F16H 49/001
See application file for complete search history.

(56) References Cited

U.S. PATENT DOCUMENTS

| | | | | |
|---|---|---|---|---|
| 6,968,755 | B2 * | 11/2005 | Kobayashi | ............. F16C 33/60 74/640 |
| 2009/0233750 | A1 * | 9/2009 | Nakamura | ................ F16H 1/32 475/162 |
| 2010/0224436 | A1 | 9/2010 | Shiina et al. | |

FOREIGN PATENT DOCUMENTS

| | | |
|---|---|---|
| JP | 02-296038 A | 12/1990 |
| JP | 2009-133415 A | 6/2009 |
| JP | 2012-193822 A | 10/2012 |
| WO | WO-2009-054328 A1 | 4/2009 |

* cited by examiner

*Primary Examiner* — Jake Cook
(74) *Attorney, Agent, or Firm* — Harness, Dickey & Pierce, P.L.C.

(57) ABSTRACT

A robot includes a first member, a second member that is provided so as to be movable around the first member, and a gear device that transmits driving force from one of the first member and the second member to the other. The gear device includes an internal gear, a flexible external gear that has an external tooth portion, which partially meshes with the internal gear, and a body portion, which is linked to the external tooth portion in a direction of a rotation axis, and a wave generator that comes into contact with the external gear and moves a position where the internal gear and the external gear are meshed with each other in a circumferential direction. An exterior surface of the body portion has an oil-repellent portion of which oil repellency is higher than oil repellency of an exterior surface of the external tooth portion.

10 Claims, 10 Drawing Sheets

ROBOT, GEAR DEVICE, AND MANUFACTURING METHOD FOR GEAR DEVICE

BACKGROUND

1. Technical Field

The present invention relates to a robot, a gear device, and a manufacturing method for a gear device.

2. Related Art

In a robot that includes a robot arm which is configured so as to have at least one arm, for example, a joint portion of the robot arm is driven by a motor but driving force from the motor is decelerated by a decelerator in general.

For example, a motor unit that has a rotation-driving portion, which drives a rotor (rotation axis), and a deceleration portion, which decelerates and outputs the rotation of the rotor, is disclosed in JP-A-2012-193822. The deceleration portion of the motor unit includes a wave generator that integrally rotates with the rotor, a flexspline (elastic gear) that has external teeth disposed on an outside thereof, and a rigid circular spline (internal gear) that has internal teeth disposed on an outside thereof. In such a deceleration portion, when the wave generator rotates with the rotation of the rotor, the rotation is transmitted to the circular spline via the flexspline. Consequently, the circular spline is decelerated and rotated at a predetermined deceleration rate with respect to the rotation of the rotor.

In addition, in the motor unit in JP-A-2012-193822, an oil seal and an oil-repellent portion are provided between the deceleration portion and the rotation-driving portion in order to restrict an oil leak from a deceleration portion side to a rotation-driving portion side.

However, in the motor unit disclosed in JP-A-2012-193822, oil, which is positioned on a meshing portion of the external teeth and the internal teeth inside the deceleration portion, spills although an oil leak to the rotation-driving portion side is restricted. As a result, there is a problem, in which holding oil on the meshing portion in the long term is difficult.

SUMMARY

An advantage of some aspects of the invention is to provide a robot, which includes a gear device that can reduce the spill of a lubricant from a meshing portion, the gear device, and a manufacturing method for a gear device.

The advantage can be achieved by the following configurations.

A robot according to an aspect of the invention includes a first member, a second member that is provided so as to be movable around the first member, and a gear device that transmits driving force from one of the first member and the second member to the other. The gear device includes an internal gear, a flexible external gear that has an external tooth portion, which partially meshes with the internal gear, and a body portion, which is linked to the external tooth portion in a direction of a rotation axis, and a wave generator that comes into contact with the external gear and moves a position where the internal gear and the external gear are meshed with each other in a circumferential direction. An exterior surface of the body portion has an oil-repellent portion of which oil repellency is higher than oil repellency of an exterior surface of the external tooth portion.

According to such a robot according to the aspect of the invention, the spill of a lubricant disposed on the exterior surface (tooth surface) of the external tooth portion to the body portion can be reduced since the oil-repellent portion is provided on the body portion linked to the external tooth portion. For this reason, a lubricant can be held on the meshing portion in the long term. As a result, the life of the gear device can be lengthened by preventing burning and wear from occurring in the meshing portion in the long term.

In the robot according to the aspect of the invention, it is preferable that the oil-repellent portion is provided at least on a portion of the body portion on a side of the external tooth portion.

With this configuration, the spill of a lubricant from the external tooth portion to the body portion can be effectively restricted.

In the robot according to the aspect of the invention, it is preferable that the exterior surface of the external tooth portion has a plurality of recessed portions or a plurality of projection portions.

With this configuration, a lubricant is more likely to remain on the exterior surface of the external tooth portion.

In the robot according to the aspect of the invention, it is preferable that the oil-repellent portion is configured of a material including fluorine.

With this configuration, free energy of the exterior surface of the oil-repellent portion can decline. For this reason, the oil repellency of a lubricant on the oil-repellent portion can be increased.

In the robot according to the aspect of the invention, it is preferable that the oil-repellent portion has a plurality of recessed portions or a plurality of projection portions.

With this configuration, a contact angle of the lubricant on the oil-repellent portion can be made larger. For this reason, oil repellency in the oil-repellent portion can be further increased.

In the robot according to the aspect of the invention, it is preferable that the body portion is disposed vertically lower than the external tooth portion, in the gear device.

In the gear device mounted in such posture, a lubricant provided on the external tooth portion is likely to flow to the body portion, which is positioned vertically lower, due to gravity. For this reason, providing the oil-repellent portion in the body portion included in such a gear device is particularly effective in restricting the spill of the lubricant from the external tooth portion to the body portion.

In the robot according to the aspect of the invention, it is preferable that a direction in which the rotation axis of the gear device extends may be changed with driving of at least one of the first member and the second member.

In the robot, in which the posture of the gear device changes with the driving of the first member or the second member as described above, a lubricant provided on the external tooth portion is likely to flow in the body portion due to an external force (for example, gravity and a centrifugal force). For this reason, in the robot in which the posture of the gear device changes as described above, providing the oil-repellent portion in the body portion is particularly effective in restricting the spill of the lubricant from the external tooth portion to the body portion.

In the robot according to the aspect of the invention, it is preferable that the gear device has a member having a surface opposing the body portion, and the surface of the member has a portion of which oil repellency is higher than oil repellency of the exterior surface of the external tooth portion or an exterior surface of the internal gear.

With this configuration, the spill of a lubricant from the meshing portion between the external tooth portion and the internal gear can be more effectively restricted.

A gear device according to an aspect of the invention includes an internal gear, a flexible external gear that has an external tooth portion, which partially meshes with the internal gear, and a body portion, which is linked to the external tooth portion in a direction of a rotation axis, and a wave generator that comes into contact with the external gear and moves a position where the internal gear and the external gear are meshed with each other in a circumferential direction. An exterior surface of the body portion has an oil-repellent portion of which oil repellency is higher than oil repellency of an exterior surface of the external tooth portion.

According to such a gear device according to the aspect of the invention, the spill of a lubricant disposed on the exterior surface (tooth surface) of the external tooth portion to the body portion can be reduced.

A manufacturing method for a gear device according to an aspect of the invention includes preparing an internal gear, a flexible external gear that has an external tooth portion, which partially meshes with the internal gear, and a body portion, which is linked to the external tooth portion in a direction of a rotation axis, and a wave generator that comes into contact with the external gear and moves a position where the internal gear and the external gear are meshed with each other in a circumferential direction, and forming an oil-repellent portion, of which oil repellency is higher than oil repellency of an exterior surface of the external tooth portion, on an exterior surface of the body portion.

According to such a manufacturing method for a gear device according to the aspect of the invention, the gear device having the external gear, which can reduce the spill of a lubricant disposed on the exterior surface (tooth surface) of the external tooth portion to the body portion, can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot, a gear device, and a manufacturing method for a gear device according to the invention will be described in detail based on preferable embodiments illustrated in the accompanying drawings.

First Embodiment

1. Robot

First, a first embodiment of a robot according to the invention will be described.

Figure 1:
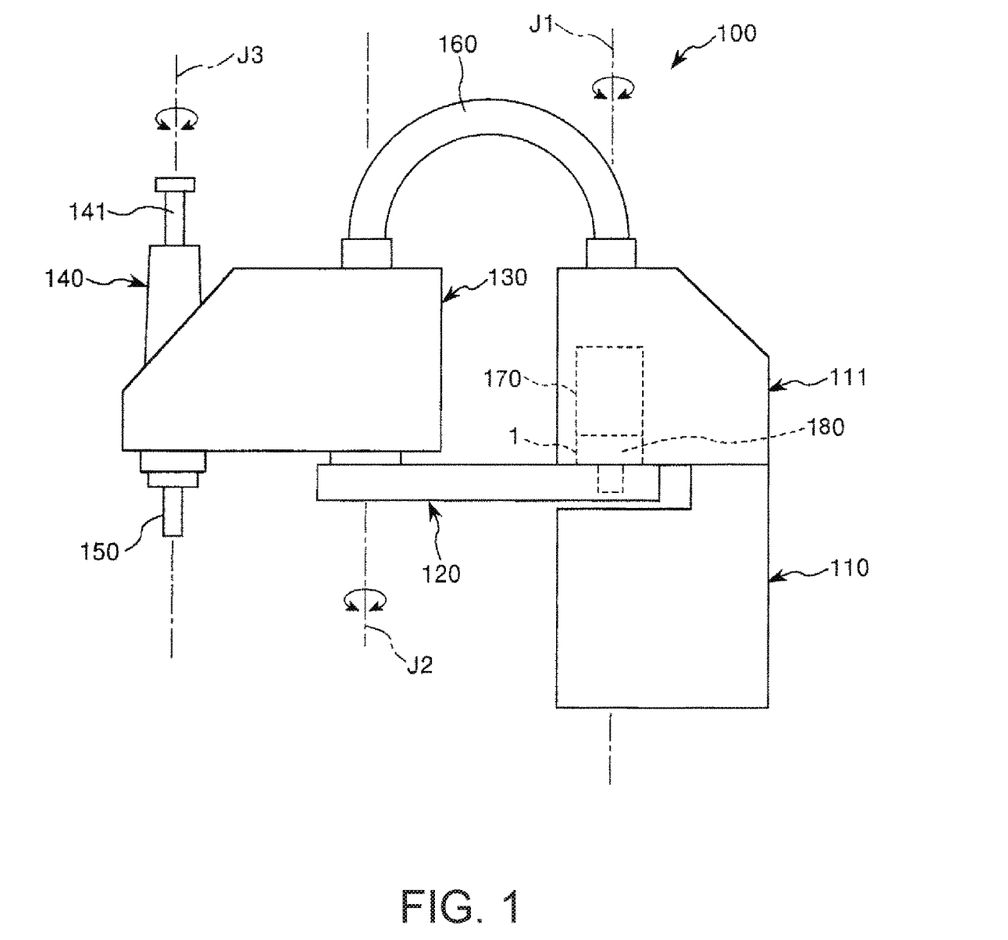
FIG. 1 is a schematic side view of a robot according to a first embodiment of the invention.

FIG. 1 is a schematic side view of the robot according to the first embodiment of the invention. Hereinafter, an upper side in FIG. 1 will be referred to as "up" and a lower side will be referred to as "down", for convenience of description. In addition, a base side in FIG. 1 will be referred to as a "base end", and a side opposite thereto (end effector side) will be referred to as a "tip". In addition, an up-and-down direction in FIG. 1 will be referred to as a "vertical direction", and a right-and-left direction will be referred to as a "horizontal direction".

A robot 100 illustrated in FIG. 1 can perform work of feeding, removing, transporting, and assembling a precision apparatus and components (target objects) that configure the precision apparatus.

As illustrated in FIG. 1, the robot 100 has a base 110, a housing 111, a first arm 120, a second arm 130, a work head 140, an end effector 150, and a wiring routing unit 160. Hereinafter, each portion of the robot 100 will be briefly described in order.

The base 110 is fixed to, for example, a floor (not illustrated) by means of a bolt. The base 110 is in a hollow rectangular parallelepiped shape, and a control device 190 that controls the robot 100 is mounted inside the base 110. In addition, the base 110 has a protruded portion that protrudes from an upper portion thereof. The housing 111 is connected to an upper end portion of the protruded portion. Consequently, a space is formed between the base 110 and the housing 111.

The first arm 120 is connected to a lower end portion of the housing 111, and a part of the first arm 120 (base end portion) is positioned inside the space between the base 110 and the housing 111. The first arm 120 is movable around a first axis J1 (moving-around axis) that extends in the vertical direction with respect to the base 110.

A drive source that has a first motor 170, such as a servomotor which generates driving force to move the first arm 120 around, and a gear device 1, which is a first decelerator to decelerate the driving force from the first motor 170 is mounted inside the housing 111. An input axis of the gear device 1 is connected to a rotation axis of the first motor 170, and an output axis of the gear device 1 is connected to the first arm 120. For this reason, when the first motor 170 is driven and the driving force is transmitted to the first arm 120 via the gear device 1, the first arm 120 moves around the first axis J1 in a horizontal plane with respect to the housing 111 and the base 110 connected to the housing. In addition, a first encoder 180 that detects a rotation state (moving-around state) of the first arm 120 with respect to the housing 111 and the base 110 is provided in the gear device 1 on an output axis side.

The second arm 130 is connected to a tip portion of the first arm 120. The second arm 130 is movable around a second axis J2 (moving-around axis) that extends in the vertical direction with respect to the first arm 120. Although not illustrated, a drive source that has a second motor, which generates driving force to move the second arm 130 around, and a second decelerator, which decelerates the driving force from the second motor, is mounted inside the second arm 130. By the driving force from the second motor being transmitted to the second arm 130 via the second decelerator, the second arm 130 moves around the second axis J2 in a horizontal plane with respect to the first arm 120. In addition, although not illustrated, a second encoder that detects a rotation state of the second arm 130 with respect to the first arm 120 is provided in the second decelerator on an output axis side.

The work head 140 is disposed on a tip portion of the second arm 130. The work head 140 has a spline shaft 141 that is inserted in a spline nut and a ball screw nut (none of which are illustrated), which are coaxially disposed on the tip portion of the second arm 130. The spline shaft 141 is rotatable around an axis J3 thereof with respect to the second arm 130, and is movable (elevation) in the up-and-down direction.

Although not illustrated, a rotation motor and an elevation motor are disposed inside the second arm 130. When driving force from the rotation motor is transmitted to the spline nut by a driving force transmitting mechanism (not illustrated) and the spline nut rotates forward and reversely, the spline shaft 141 rotates forward and reversely around the axis J3 that extends in the vertical direction. In addition, although not illustrated, a third encoder that detects a rotation state of the spline shaft 141 with respect to the second arm 130 is provided for the rotation motor.

On the other hand, when driving force from the elevation motor is transmitted to the ball screw nut by the driving force transmitting mechanism (not illustrated) and the ball screw nut rotates forward and reversely, the spline shaft 141 moves up and down. In addition, although not illustrated, a fourth encoder that detects a movement amount of the spline shaft 141 with respect to the second arm 130 is provided for the elevation motor.

The end effector 150 is connected to a tip portion (lower end portion) of the spline shaft 141. The end effector 150 is not particularly limited, and examples of the end effector include an end effector that grasps an object to be transported and an end effector that processes an object to be processed.

A plurality of pieces of wiring connected to each of electronic components (for example, the second motor, the rotation motor, the elevation motor, and the second to fourth encoders), which are disposed inside the second arm 130, are routed into the base 110 through the tubular wiring routing unit 160 that connects the second arm 130 and the housing 111 together and the inside of the housing 111. By being organized inside the base 110, the plurality of pieces of wiring are routed to the control device 190 mounted inside the base 110, along with wiring connected to the first motor 170 and the first encoder 180.

The robot 100 described above includes the housing 111, which is a "first member", the first arm 120, which is a "second member" provided so as to be movable around the housing 111, and the gear device 1. The gear device 1 transmits driving force from one of the housing 111 (first member) and the first arm 120 (second member) to the other.

Such a robot 100 can lengthen the life of a gear device since the gear device has a configuration to be described in detail in the following.

The first arm 120 and the second arm 130 may be considered as the "second member". In addition, the "second member" may further include the work head 140 and the end effector 150 in addition to the first arm 120 and the second arm 130.

In addition, although the first decelerator is configured of the gear device 1 in the embodiment, the second decelerator may be configured of the gear device 1 and both of the first decelerator and the second decelerator may be configured of the gear device 1. In a case where the second decelerator is configured of the gear device 1, the first arm 120 may be considered as the "first member", and the second arm 130 may be considered as the "second member".

2. Gear Device

Hereinafter, an embodiment of the gear device according to the invention will be described.

Figure 2:
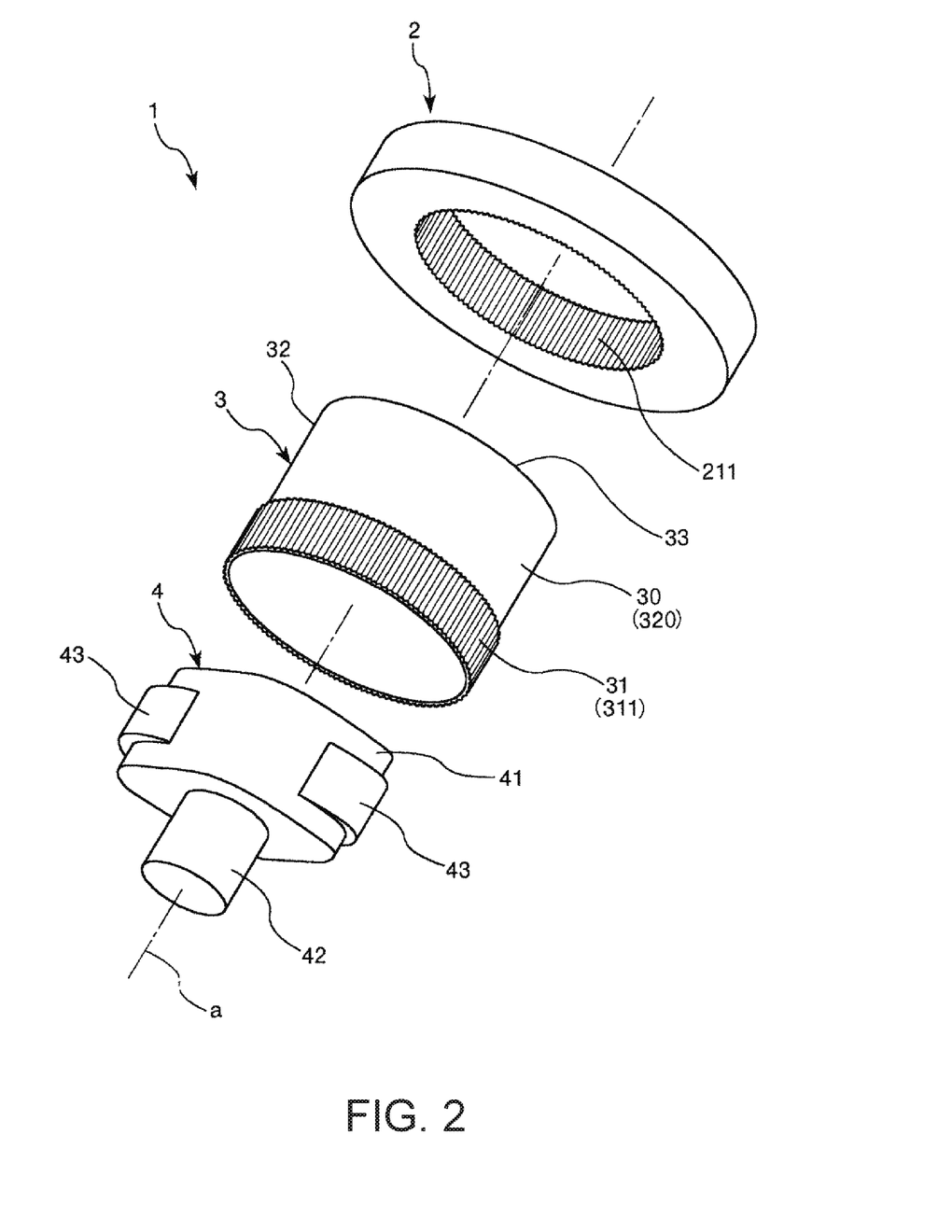
FIG. 2 is an exploded perspective view illustrating a gear device included in the robot illustrated in FIG. 1.
Figure 3:
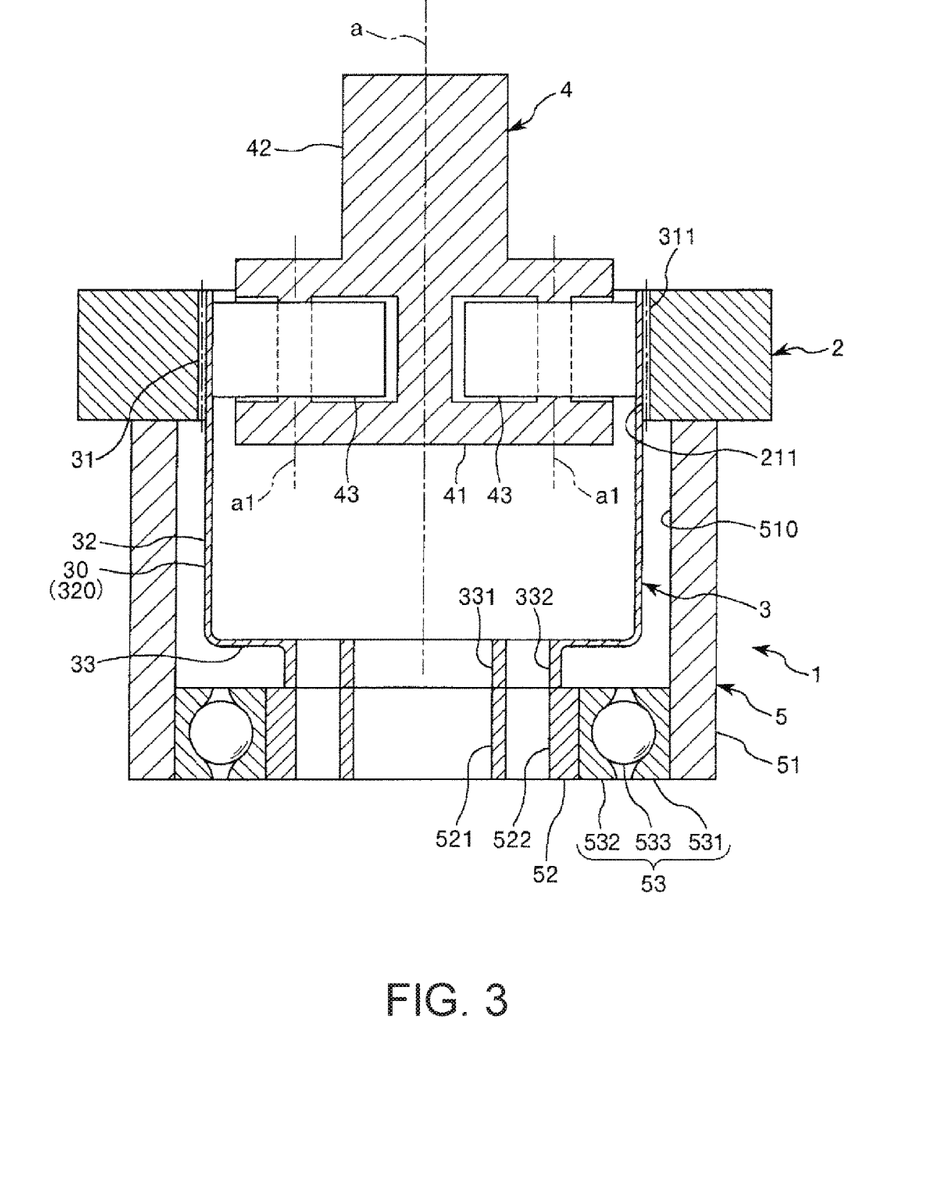
FIG. 3 is a longitudinal sectional view of the gear device illustrated in FIG. 2.
Figure 4:
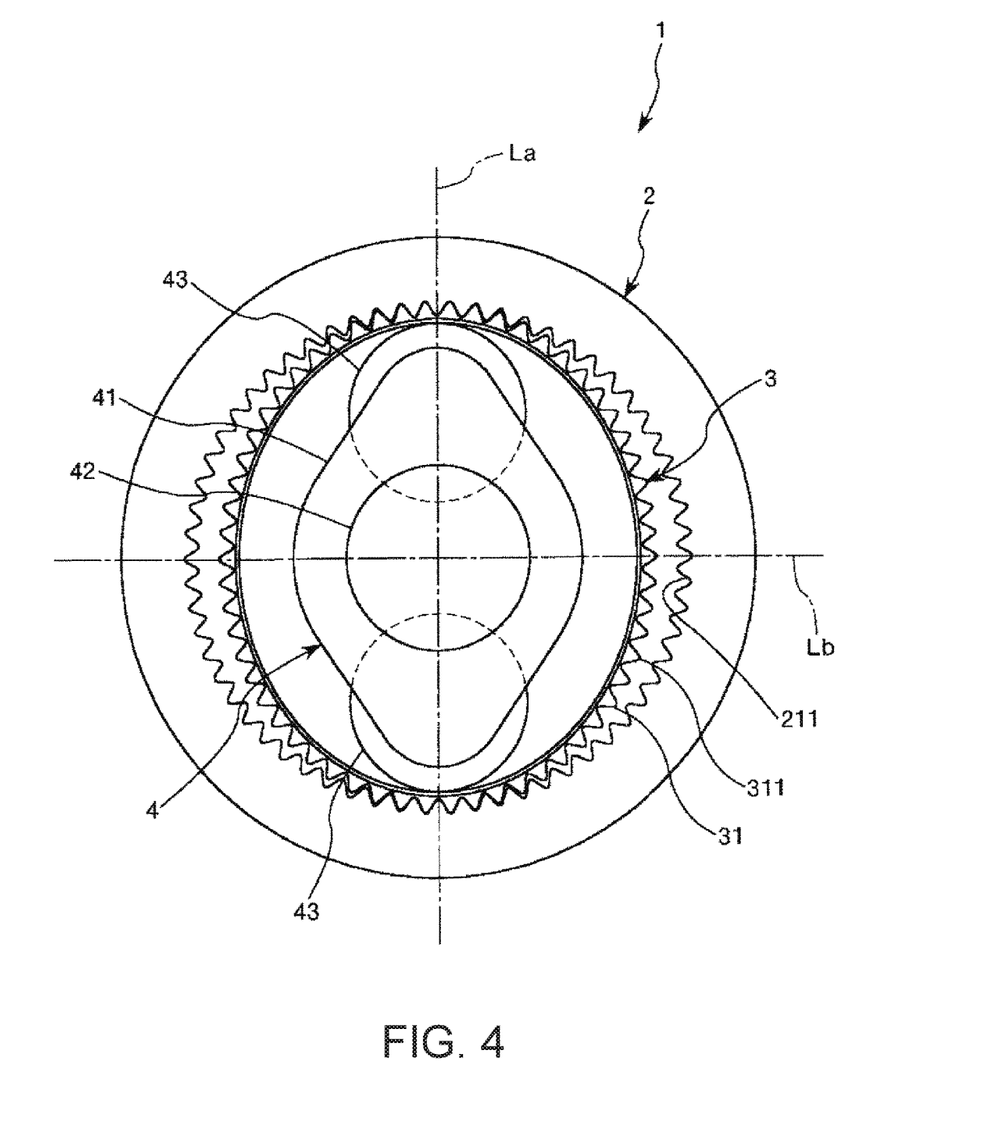
FIG. 4 is a front view of the gear device illustrated in FIG. 2.

FIG. 2 is an exploded perspective view illustrating the gear device included in the robot illustrated in FIG. 1. FIG. 3 is a longitudinal sectional view of the gear device illustrated in FIG. 2. FIG. 4 is a front view of the gear device illustrated in FIG. 2. In each drawing, the size of each portion will be exaggeratingly illustrated as appropriate, if necessary for convenience of description, and a size ratio between respective portions does not necessarily match an actual size ratio.

The gear device 1 illustrated in FIG. 2 to FIG. 4 is a wave gear device, and is used, for example, as a decelerator. The gear device 1 has a rigid gear 2, which is an internal gear, a flexible gear 3, which is a cup-like external gear disposed on an inside of the rigid gear 2, a wave generator 4 disposed on an inside of the flexible gear 3, and a case unit 5, which allows relative rotation of the rigid gear 2 and the flexible gear 3 and is fixed to the rigid gear and the flexible gear.

In the gear device 1, a cross section of the flexible gear 3 has a portion that is deformed in an oval shape or an elliptical shape by the wave generator 4, and in both end portions of this portion on along axis side, the flexible gear 3 is meshed with the rigid gear 2. The number of teeth of the rigid gear 2 and the number of teeth of the flexible gear 3 are different from each other.

In such a gear device 1, for example, when driving force (for example, driving force from the first motor 170 described above) is input into the wave generator 4, the rigid gear 2 and the flexible gear 3 relatively rotate around an axis a (rotation axis of the gear device 1) due to a difference in the number of teeth while a position where the rigid gear and the flexible gear are meshed with each other moves in a circumferential direction. Consequently, the driving force input from the drive source (for example, the first motor 170 described above) in the wave generator 4 can be decelerated so as to be output from the flexible gear 3. That is, a decelerator, in which the wave generator 4 is on an input axis side and the flexible gear 3 on an output axis side, can be realized.

Hereinafter, a configuration of the gear device 1 will be briefly described.

As illustrated in FIG. 2 to FIG. 4, the rigid gear 2 is a gear that is configured of a rigid body, which practically does not deflect in a diameter direction, and is a ring-like internal gear that has internal teeth 211. In the embodiment, the rigid gear 2 is a spur gear. That is, the internal teeth 211 have tooth traces parallel to the axis a. The tooth traces of the internal teeth 211 may be inclined with respect to the axis a. That is, the rigid gear 2 may be a helical gear or a double helical gear.

The flexible gear 3 is inserted in the rigid gear 2. The flexible gear 3 is a gear having flexibility that is flexurally deformable in the diameter direction, and is an external gear that has external teeth 311 (teeth), which mesh with the internal teeth 211 of the rigid gear 2. In addition, the number of teeth of the flexible gear 3 is smaller than the number of teeth of the rigid gear 2. By the number of teeth of the flexible gear 3 and the number of teeth of the rigid gear 2 being different from each other as described above, the decelerator can be realized.

In the embodiment, the flexible gear 3 has a cup-like shape, of which one end is opened, and the external teeth 311 are formed in an end portion of the flexible gear on an opening side. Herein, the flexible gear 3 has an external tooth portion 31 that has the external teeth 311, a tubular (more specifically, cylindrical) body portion 32 (tubular portion) around the axis a, which is linked to the external tooth portion 31 in a direction of the axis a, and a bottom portion 33 that is connected to one end portion of the body portion 32 in the direction of the axis a. Consequently, the external tooth portion 31 can be made likely to deflect in the diameter direction. For this reason, good deflection-meshing of the flexible gear 3 with the rigid gear 2 can be realized. In addition, the rigidity of the end portion of the body portion 32 on a bottom portion 33 side can be increased. For this reason, an input axis or an output axis can be stably connected to the bottom portion 33.

In addition, as illustrated in FIG. 3, a hole 331 that is pierced along the axis a and a plurality of holes 332 that are pierced adjacent to the hole 331 are formed in the bottom portion 33. A shaft body on an output side can be inserted into the hole 331. In addition, the holes 332 can be used as screw holes into which screws for fixing the shaft body on the output side to the bottom portion 33 are inserted. The holes may be provided as appropriate, and can also be omitted.

As illustrated in FIG. 4, the wave generator 4 is disposed on the inside of the flexible gear 3, and is rotatable around the axis a. The wave generator 4 deforms across section of the external tooth portion 31 into an oval shape or an elliptical shape having a long axis La and a short axis Lb and meshes the external teeth 311 with the internal teeth 211 of the rigid gear 2. At this time, the flexible gear 3 meshes with the rigid gear 2 inside and outside of each other so as to be rotatable around the same axis a.

As illustrated in FIG. 3, the wave generator 4 has a main body portion 41, a shaft portion 42 that protrudes from the main body portion 41 along the axis a, and a pair of rollers 43 that is provided so as to be rotatable around axes a1, which is parallel to the axis a with respect to the main body portion 41, in the embodiment. In such a wave generator 4, the pair of rollers 43 presses and widens the flexible gear 3 from the inside while turning on an inner circumferential surface of the flexible gear 3, and the main body portion 41, the shaft portion 42, and the pair of rollers 43 are rotatable around the axis a. Therefore, for example, when driving force is input from the drive source into the wave generator 4, a position where the rigid gear 2 and the flexible gear 3 are meshed with each other moves in the circumferential direction.

As illustrated in FIG. 3, the case unit 5 is disposed on an outside of the flexible gear 3. The case unit 5 has a housing 51 fixed to the rigid gear 2, a boss 52 fixed to the bottom portion 33 of the flexible gear 3, and a bearing 53 provided between the housing 51 and the boss 52.

The housing 51 is in a shape of surrounding the body portion 32 of the flexible gear 3, and has an inner circumferential surface 510 (surface) opposing the body portion 32. The boss 52 has holes 521 and 522 corresponding to the holes 331 and 332. In addition, the bearing 53 is a radial ball bearing that has an outer ring 531, an inner ring 532, and a plurality of balls 533. The bearing 53 may be, for example, a thrust ball bearing, a radial roller bearing, and a thrust roller bearing.

In addition, examples of configuration materials of the rigid gear 2, the flexible gear 3, the wave generator 4, and the case unit 5 described above each include various types of ceramics, various types of metals, and various types of resins. One type, out of the above material types, can be used alone or in combination with two or more types of materials. Among the above materials, it is preferable to mainly configure the rigid gear, the flexible gear, the wave generator, and the case unit of a metal, and in particular, it is preferable that an iron-based material is used since the iron-based material is excellent in mechanical properties and processability and is relatively inexpensive. Although such an iron-based material is not particularly limited, examples of the iron-based material include cast iron, nickel-chrome-molybdenum steel, maraging steel, and precipitation hardening stainless steel.

Hereinbefore, the configuration of the gear device 1 has been briefly described. In such a gear device 1, as described above, for example, when driving force is input into the wave generator 4, the rigid gear 2 and the flexible gear 3 relatively rotate around the axis a due to a difference in the number of teeth while a position where the rigid gear 2 and the flexible gear 3 are meshed with each other moves in the circumferential direction. At this time, the flexible gear 3 repeatedly deforms and repeatedly comes into contact with and separates away from the wave generator 4. A lubricant is provided between the rigid gear 2 having the internal teeth 211 and the external tooth portion 31 of the flexible gear 3 having the external teeth 311 in order to reduce friction between the internal teeth 211 and the external teeth 311. The gear device 1 of the embodiment has a configuration described in the following in order to reduce the spill of a lubricant from between the rigid gear 2 and the external tooth portion 31 and to lengthen the life of the gear device 1.

Figure 5:
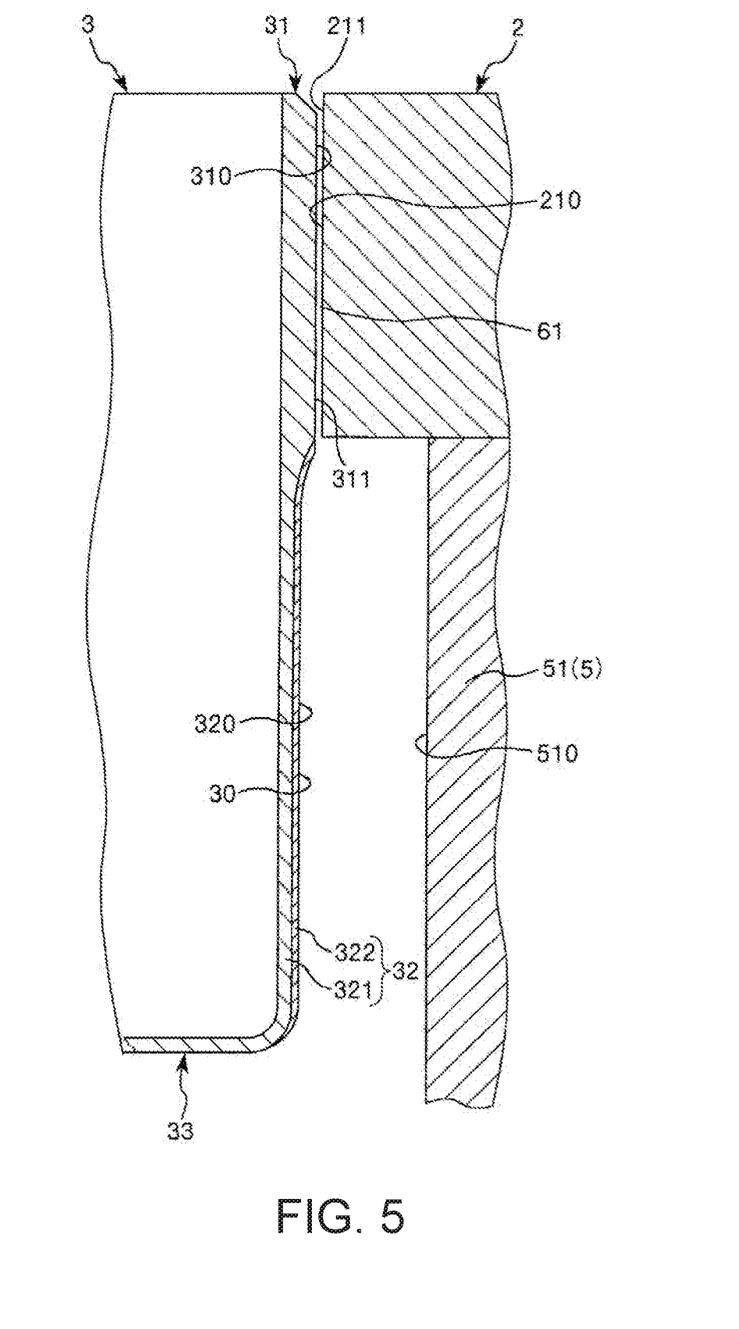
FIG. 5 is a view illustrating a meshing portion between a rigid gear and a flexible gear of the gear device illustrated in FIG. 2 and a configuration nearby the meshing portion.
Figure 6:
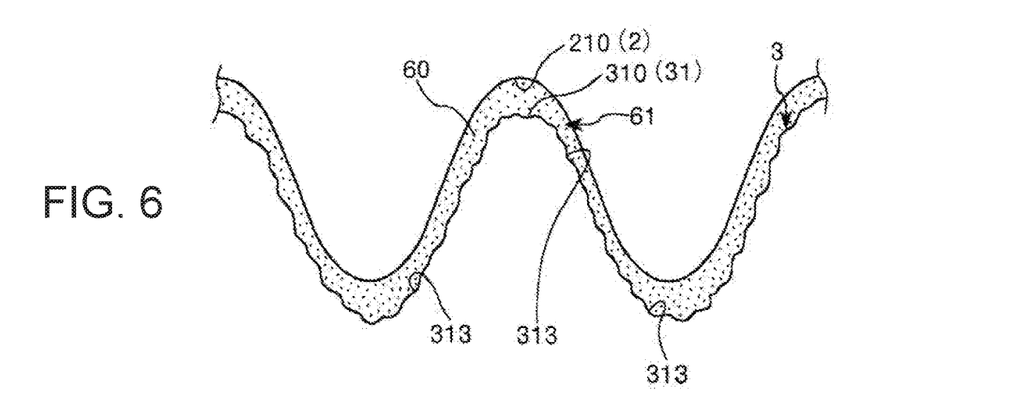
FIG. 6 is a view illustrating a configuration of an exterior surface of an external tooth portion of the flexible gear illustrated in FIG. 5.
Figure 7:
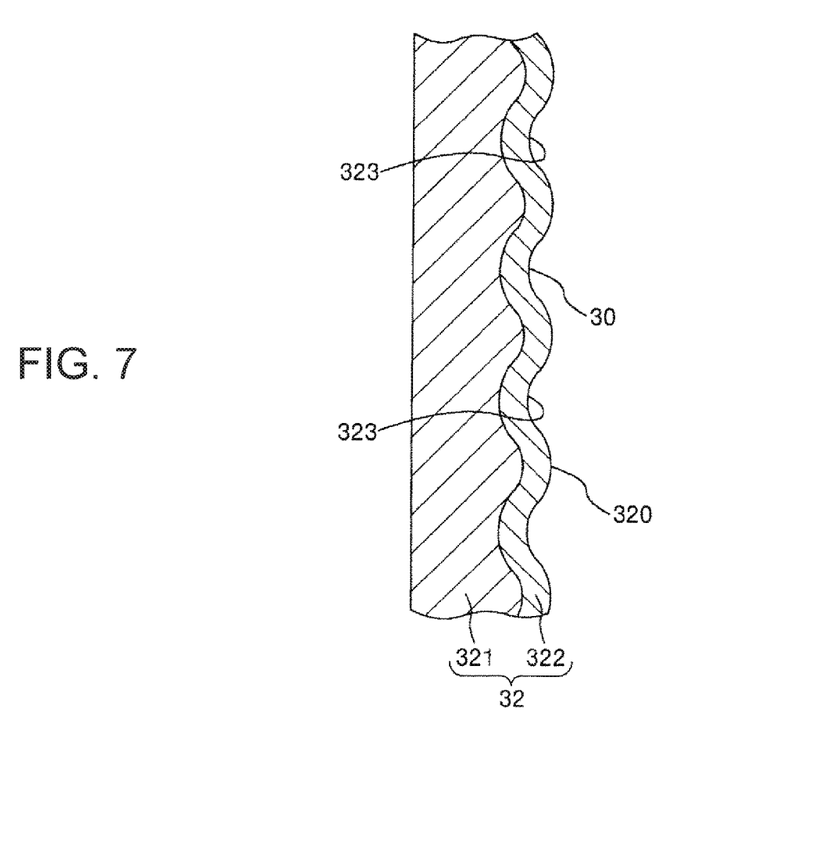
FIG. 7 is a view illustrating a configuration of an exterior surface of a body portion of the flexible gear illustrated in FIG. 5.

FIG. 5 is a view illustrating a meshing portion between the rigid gear and the flexible gear of the gear device illustrated in FIG. 2 and a configuration nearby the meshing portion. FIG. 6 is a view illustrating a configuration of an exterior surface of the external tooth portion of the flexible gear illustrated in FIG. 5. FIG. 7 is a view illustrating a configuration of an exterior surface of the body portion of the flexible gear illustrated in FIG. 5.

As described above, the gear device 1 has the rigid gear 2, which is the "internal gear", the flexible gear 3, which is the flexible "external gear" including the external tooth portion 31 that partially meshes with the rigid gear 2 and the body portion 32 that is linked to the external tooth portion 31 in the direction of the axis a, which is a rotation axis, and the wave generator 4, which comes into contact with the flexible gear 3 and moves a position where the rigid gear 2 and the flexible gear 3 are meshed with each other in the circumferential direction.

As illustrated in FIG. 5, an outer circumferential surface 320 (exterior surface) of the body portion 32 has an oil-repellent portion 30, of which oil repellency is higher than that of tooth surface 310 (exterior surface) of the external tooth portion 31. Herein, as illustrated in FIG. 6, a lubricant 60 is provided on a meshing portion 61 between the rigid gear 2 and the external tooth portion 31 of the flexible gear 3 in order to reduce friction. By the rigid gear 2 and the external tooth portion 31 repeatedly coming into contact with each other, the lubricant 60 is likely to spill from the meshing portion 61 to the body portion 32. In the embodiment, since the outer circumferential surface 320 of the body portion 32 has the oil-repellent portion 30, the lubricant 60 that is about to spill can be repelled by the oil-repellent portion 30 so as to remain on the external tooth portion 31. For this reason, the spill of the lubricant 60 from the meshing portion 61 to the body portion 32 can be reduced, and the lubricant 60 can be held on the meshing portion 61 for a longer term. As a result, the life of the gear device 1 can be lengthened by preventing burning and wear from occurring in the meshing portion 61 in the long term. Alternatively, the replenishment frequency of the lubricant 60 can be decreased.

Figure 9:
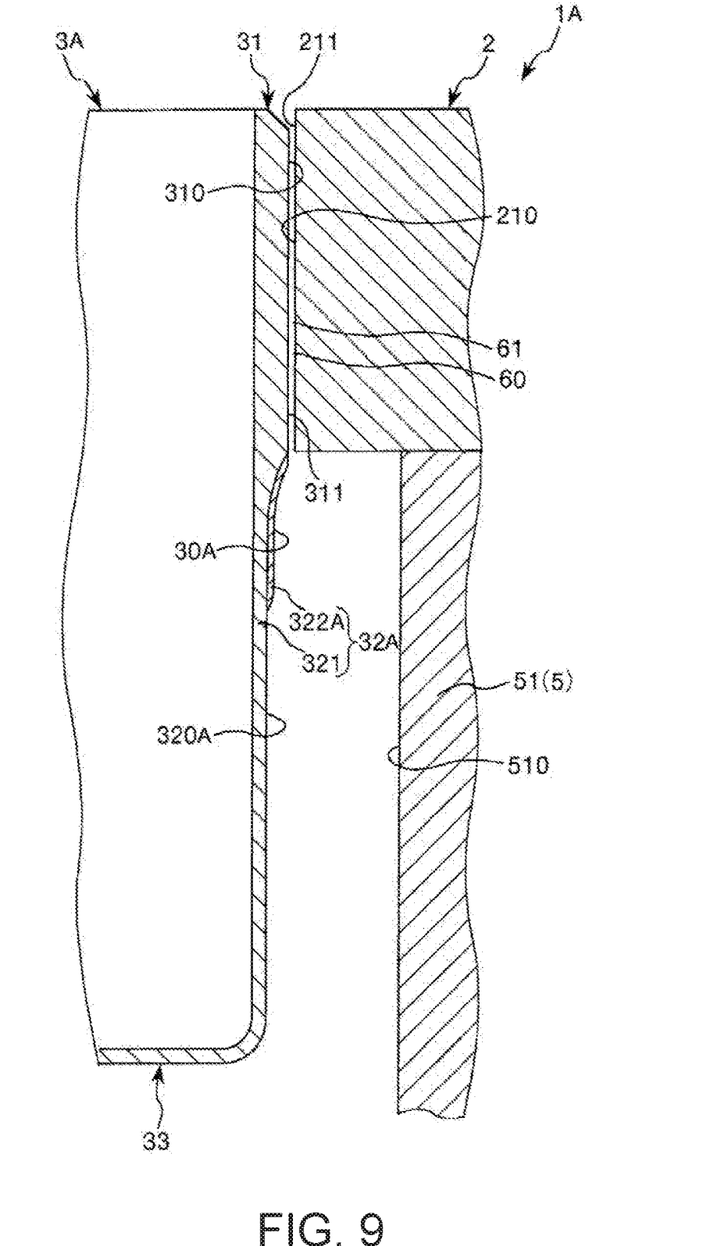
FIG. 9 is a view illustrating an oil-repellent portion of a gear device included in a robot according to a second embodiment of the invention.

In addition, in the embodiment, the entire area of the outer circumferential surface 320 of the body portion 32 configures the oil-repellent portion 30. Consequently, the effect described above can be made conspicuous. The oil-repellent portion 30 may be provided at least on a portion of the body portion 32 on an external tooth portion 31 side (for example, a part formed as illustrated in FIG. 9). Consequently, the spill of the lubricant 60 from the external tooth portion 31 to the body portion 32 can be effectively restricted.

Herein, in the embodiment, the body portion 32 is configured of the main body portion 321 and a coating film 322 provided on an exterior surface of the main body portion 321, as illustrated in FIG. 5 and FIG. 7. An exterior surface of the coating film 322 configures the oil-repellent portion 30.

Although a configuration material of the coating film 322 is not particularly limited insofar as the material has oil repellency, examples of the material include a fluorine-based resin, a silicone-based resin, and ceramics. One type, out of the above material types, can be used alone or in combination with two or more types of materials. It is preferable to use a fluorine-based resin among the material types. Examples of a fluorine-based resin include polytetrafluoroethylene (PTFE), polychlorotrifluoroethylene (PCTFE), polyvinylidene fluoride (PVDF), polyvinyl fluoride (PVF), perfluoroalkoxy alkanes (PFA), fluorinated ethylene propylene (FEP), ethylene tetrafluoroethylene (ETFE), and ethylene-chlorotrifluoroethylene (ECTFE).

By the oil-repellent portion 30 being configured of a material including fluorine in such a manner, free energy of an exterior surface of the oil-repellent portion 30 can decline. For this reason, the oil repellency of the lubricant on the oil-repellent portion 30 can be increased. Specifically, by the oil-repellent portion being configured of a material including fluorine, free energy of the exterior surface of the oil-repellent portion 30 can be made approximately equal to or larger than 10 mJ/m$^2$ and equal to or smaller than 25 m J/m$^2$.

In addition, as illustrated in FIG. 7, the main body portion 321 of the body portion 32 has a plurality of minute recessed portions. The coating film 322, which is provided on the exterior surface of the main body portion 321, is provided along the plurality of minute recessed portions of the main body portion 321. For this reason, the exterior surface of the coating film 322, that is, the oil-repellent portion 30 has a plurality of minute recessed portions 323. Consequently, a contact angle of the lubricant 60 on the oil-repellent portion 30 can be made even larger. For this reason, oil repellency in the oil-repellent portion 30 can be further increased. Specifically, by the oil-repellent portion being configured of a material including fluorine, the contact angle of the lubricant 60 on the oil-repellent portion 30 can be made, for example, approximately equal to or larger than 90° and equal to or smaller than 120°, depending on the type of the lubricant 60. The oil-repellent portion 30 may have a plurality of projection portions instead of the plurality of recessed portions 323, and may have a plurality of recessed portions and a plurality of projection portions. In addition, in the embodiment, the plurality of recessed portions 323 may be randomly formed, or may be regularly formed.

It is preferable that the surface roughness Ra (JIS B 0601) of the oil-repellent portion 30 is within a range of 0.01 μm to 10.0 μm inclusive, it is more preferable to be within a range of 0.03 μm to 7.0 μm inclusive, and it is even more preferable to be within a range of 0.05 μm to 5.0 μm inclusive. Consequently, oil repellency in the oil-repellent portion 30 can be effectively increased.

Although a configuration, in which the body portion 32 includes the coating film 322, has been adopted in the embodiment, the body portion 32 may not include the coating film 322. In this case, a layer (oil repellent coating layer) formed by a method other than coating (for example, bonding of a film) and the oil-repellent portion 30 formed by the exterior surface of the main body portion 321 of the body portion 32 being fluorine-plasma processed may be given as examples.

In addition, as illustrated in FIG. 6, the tooth surface 310 (exterior surface) of the external tooth portion 31 on which the lubricant 60 is disposed has a plurality of minute recessed portions 313. Consequently, the lubricant 60 remains on the tooth surface 310, and the spill of the lubricant 60 from the meshing portion 61 can be further reduced. That is because the lubricant 60 enters each of the recessed portions 313. The tooth surface 310 may have a plurality of projection portions instead of the plurality of recessed portions 313, and may have a plurality of recessed portions and a plurality of projection portions. In addition, in the embodiment, the recessed portions 313 may be randomly formed, or may be regularly formed.

It is preferable that the surface roughness Ra (JIS B 0601) of the tooth surface 310 of the external tooth portion 31 is within a range of 0.01 μm to 10.0 μm inclusive, it is more preferable to be within a range of 0.03 μm to 7.0 μm inclusive, and it is even more preferable to be within a range of 0.05 μm to 5.0 μm inclusive. Consequently, the effect in which the lubricant 60 remains on the tooth surface 310 can be made conspicuous.

The depths (sizes) of the recessed portions 313 of the tooth surface 310 may be the same as the depths (sizes) of the recessed portions 323 of the oil-repellent portion 30, and may be greater or shallower than those of the recessed portions 323.

It is preferable that the lubricant 60 includes base oil and a thickener. Consequently, the lubricant 60 can be solid or semisolid grease. Therefore, the lubricant 60 can be made likely to remain on the meshing portion 61. Herein, examples of a thickener include soap-based thickeners, such as calcium soap, calcium complex soap, sodium soap, aluminum soap, lithium soap, and lithium complex soap, and non-soap-based thickeners, such as polyurea, sodium terephthalate, polytetrafluoroethylene (PTFE), organic bentonite, and silica gel. It is preferable to use lithium soap although one type of thickener, out of the above thickener types, can be used alone or in combination with two or more types of thickeners. By using lithium soap as a thickener, the shear stability of the lubricant 60 can be made excellent. In addition, balance between characteristics of the lubricant 60, which is a lubricant, can be made excellent. In addition, examples of base oil include mineral oil (refined mineral oil), such as paraffin-based oil and naphthene-based oil, and synthetic oil, such as polyolefin oil, ester oil, and silicone oil. One type, out of the above base oil types, can be used alone or in combination with two or more types of base oil.

As described above, the gear device 1 has the housing 51, which is a member having the inner circumferential surface 510 (surface) opposing the body portion 32 (refer to FIG. 5). The inner circumferential surface 510 of the housing 51 (member) has a portion of which oil repellency is higher than that of the tooth surface 310 (exterior surface) of the external tooth portion 31 or a tooth surface 210 (exterior surface) of the rigid gear 2 (internal gear). Consequently, with the outer circumferential surface 320 of the body portion 32 and the inner circumferential surface 510 of the housing 51, the oil-repellent portion 30 can repel the lubricant 60 that is about to spill from the meshing portion 61 such that the lubricant remains on the external tooth portion 31. For this reason, the spill of the lubricant 60 between the oil-repellent portion 30 and the inner circumferential surface 510 from the meshing portion 61 can be reduced, and as a result, the lubricant 60 becomes more likely to remain on the meshing portion 61.

In addition, in the embodiment, the entire area of the inner circumferential surface 510 has higher oil repellency than the tooth surface 310 or the tooth surface 210. The portion of which oil repellency is high can suitably restrict the spill of the lubricant 60 from the meshing portion 61 insofar as the portion is provided on at least a portion of the inner circumferential surface 510 on a tooth surface 210 side. In addition, the portion of the inner circumferential surface 510 of which oil repellency is high can have the same configuration as that of the oil-repellent portion 30 described above. In addition, it is preferable that the portion of the inner circumferential surface 510 of which oil repellency is high is configured of a material including fluorine, and it is preferable to have a plurality of minute recessed portions or a plurality of projection portions. Consequently, the same effect as that of the oil-repellent portion 30 can be obtained. The evaluation of oil repellency can be carried out in a manner that a contact angle is acquired by means of a droplet method and it is determined that oil repellency becomes higher as a contact angle increases. In addition, oil repellency can be evaluated by means of a method of AATCC-118.

In the gear device 1 having such a configuration, the spill of the lubricant 60 from the meshing portion 61 can be reduced and the lubricant 60 can be held on the meshing portion 61 in the long term.

Herein, in the robot 100 having the configuration described above, the axis a, which is the rotation axis of the gear device 1 substantially matches the first axis J1 (moving-around axis). That is, the axis a extends in the vertical direction. In the gear device 1, the body portion 32 is positioned vertically lower than the external tooth portion 31. In the gear device 1 mounted in such posture, the lubricant 60 provided on the external tooth portion 31 is likely to flow to the body portion 32, which is positioned vertically lower, due to gravity. For this reason, in such a gear device 1, providing the oil-repellent portion 30 in the body portion 32 is particularly effective in restricting the spill of the lubricant 60 from the external tooth portion 31 to the body portion 32. The gear device 1 described above can be manufactured as follows.

Manufacturing Method for Gear Device

Hereinafter, a manufacturing method for a gear device according to the invention will be described by giving a case where the gear device 1 is manufactured as an example.

Figure 8:
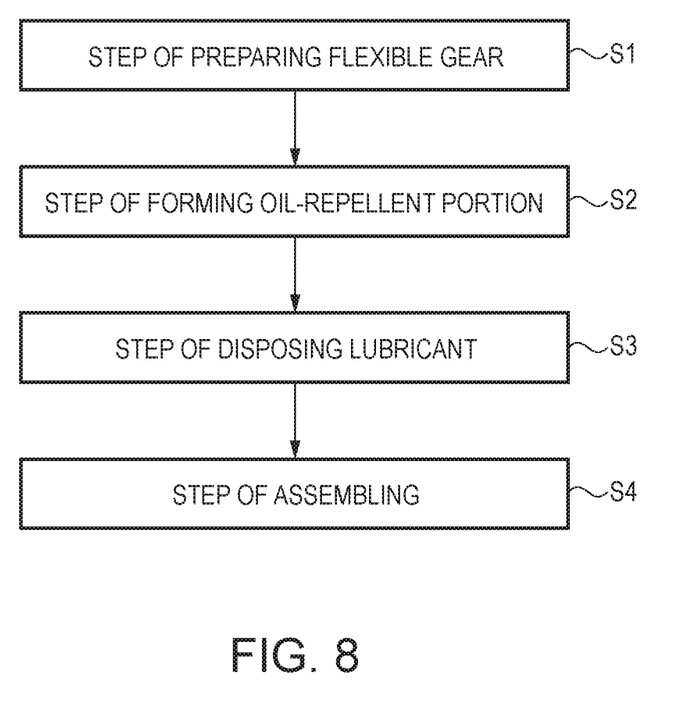
FIG. 8 is a flow chart illustrating a manufacturing method for the gear device illustrated in FIG. 2.

FIG. 8 is a flow chart illustrating a manufacturing method for the gear device illustrated in FIG. 2.

As illustrated in FIG. 8, a manufacturing method for the gear device 1 has (1) a step of preparing the flexible gear 3 (Step S1), (2) a step of forming the oil-repellent portion 30 (Step S2), (3) a step of disposing the lubricant 60 (Step S3), and (4) a step of assembling (Step S4). Hereinafter, each step will be described in order.

1. Step of Preparing the Flexible Gear 3 (Step S1)

First, the flexible gear 3, the rigid gear 2, the wave generator 4, and the case unit 5 are prepared.

Forming methods for the above portions are not particularly limited, and various types of machining and various types of forming methods can be used. In addition, examples of configuration materials of the flexible gear 3, the rigid gear 2, the wave generator 4, and the case unit 5 include the materials described above.

In addition, each of the exterior surface of the body portion 32 and the tooth surface 310 of the external tooth portion 31 included in the flexible gear 3 is, for example, shot peened. Consequently, recessed portions are formed in the exterior surface of the body portion 32, and the recessed portions 313 are formed in the tooth surface 310 of the external tooth portion 31. In addition, by means of shot peening, residual stresses are applied to the exterior surface of the body portion 32 and the tooth surface 310 of the external tooth portion 31, and the hardness of the exterior surface of the body portion 32 and the hardness of the tooth surface 310 of the external tooth portion 31 can be increased.

2. Step of Forming the Oil-Repellent Portion 30 (Step S2)

Next, the coating film 322 is formed on the body portion 32 included in the flexible gear 3. Consequently, the oil-repellent portion 30 of which oil repellency is higher than that of the tooth surface 310 of the external tooth portion 31 can be formed.

Examples of a method for forming the coating film 322 include a gas-phase film forming method, such as a chemical vapor deposition (CVD) method and a physical vapor deposition (PVD) method, and various types of liquid-phase film forming methods, such as dipping, spin coating, and spray painting.

3. Step of Disposing the Lubricant 60 (Step S3)

Next, the lubricant 60 is applied so as to be disposed on the outer circumferential surface 320 of the body portion 32 of the flexible gear 3. In addition, the lubricant 60 is also disposed inside the flexible gear 3.

4. Step of Assembling (Step S4)

Next, although not illustrated, the wave generator 4 is inserted into the flexible gear 3, and the flexible gear 3 meshes with the rigid gear 2 inside and outside of each other. In addition, the flexible gear 3 is inserted into the case unit 5, and the case unit 5 is fixed to the rigid gear 2. At this time, when meshing the flexible gear 3 with the rigid gear 2 inside and outside of each other, the lubricant 60 is interposed between the flexible gear 3 and the rigid gear 2, and the meshing portion 61 on which the lubricant 60 is disposed is formed. In addition, by inserting the wave generator 4 into the flexible gear 3, the lubricant 60 disposed on the inside of the flexible gear 3 is also supplied to the inside of the wave generator 4. The gear device 1 can be manufactured as described above.

The manufacturing method for the gear device 1 described above includes the step of preparing necessary components such as the flexible gear 3 (Step S1) and the step of forming the oil-repellent portion 30 (Step S2). In the step of preparing (Step S1), the rigid gear 2, which is the "internal gear", the flexible gear 3, which is the flexible "external gear" including the external tooth portion 31 that partially meshes with the rigid gear 2 and the body portion 32 that is linked to the external tooth portion 31 in the direction of the axis a, which is a rotation axis, and the wave generator 4, which comes into contact with the flexible gear 3 and moves a position where the rigid gear 2 and the flexible gear 3 are meshed with each other in the circumferential direction, are prepared. In the step of forming the oil-repellent portion (Step S2), the oil-repellent portion 30, of which oil repellency is higher than that of the tooth surface 310 (exterior surface) of the external tooth portion 31, is formed on the outer circumferential surface 320 (exterior surface) of the body portion 32. According to such a manufacturing method for the gear device 1, the gear device 1 having the flexible gear 3, which can reduce the spill of the lubricant 60 disposed on the tooth surface 310 of the external tooth portion 31 to the body portion 32, can be obtained.

Second Embodiment

Next, a second embodiment of the invention will be described.

FIG. 9 is a view illustrating an oil-repellent portion of a gear device included in a robot according to the second embodiment of the invention.

In the following description, differences between this embodiment and the first embodiment described above will be mainly described, and the description of the same facts will be omitted.

In a gear device 1A illustrated in FIG. 9, a body portion 32A included in a flexible gear 3A is configured of the main body portion 321 and a coating film 322A provided on a part of the exterior surface of the main body portion 321. For this reason, in the embodiment, an exterior surface of the coating film 322A and a part of the exterior surface of the main body portion 321 (portion on which the coating film 322A is not provided) configure an outer circumferential surface 320A of the body portion 32A. The exterior surface of the coating film 322A configures the oil-repellent portion 30A.

More specifically, the coating film 322A is unevenly provided on a portion of the body portion 32A on the external tooth portion 31 side. Even the coating film 322A having such a configuration can reduce the spill of the lubricant 60 from the external tooth portion 31 to the body portion 32A. In addition, a lubricant can be disposed on a portion of the body portion 32A on which the coating film 322A is not provided. By making the width of the coating film 322A relatively narrow, the lubricant can go beyond the coating film 322A from this portion and be supplied to the meshing portion 61. For this reason, the life of the gear device 1A can be lengthened by preventing burning and wear from occurring in the meshing portion 61 for a longer term. In particular, the gear device 1A having such a configuration is effective, for example, in a case where the body portion 32A is positioned vertically higher than the external tooth portion 31.

Also in the second embodiment described above, the spill of the lubricant 60 disposed on the tooth surface 310 of the external tooth portion 31 to the body portion 32A can be reduced.

Such a gear device 1A can also be mounted on a robot 800 which will be described later, in addition to the robot 100.

Third Embodiment

Next, a third embodiment of the invention will be described.

Figure 10:
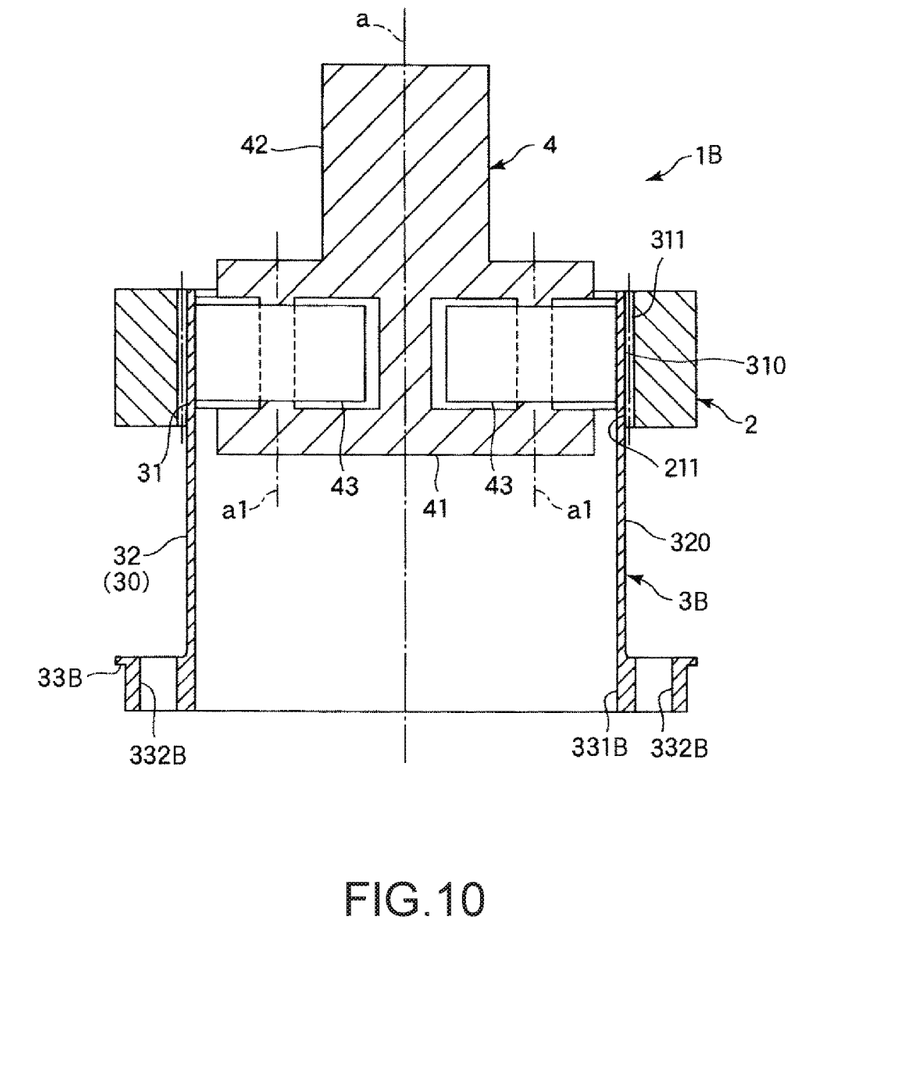
FIG. 10 is a longitudinal sectional view illustrating a gear device included in a robot according to a third embodiment of the invention.

FIG. 10 is a longitudinal sectional view illustrating a gear device included in a robot according to the third embodiment of the invention.

In the following description, differences between this embodiment and the first embodiment described above will be mainly described, and the description of the same facts will be omitted.

A gear device 1B illustrated in FIG. 10 has a flexible gear 3B, which is a hat-like external gear disposed on the inside of the rigid gear 2.

The flexible gear 3B has a flange portion 33B provided on one end portion of the tubular body portion 32 around the axis a in the direction of the axis a so as to protrude to a side opposite to the axis a. Also in the flexible gear 3B having such a shape, good deflection-meshing of the flexible gear 3B with the rigid gear 2 can be realized. In addition, an input axis or an output axis can be stably connected to the flange portion 33B.

In the embodiment, a plurality of holes 332B that are pierced along the axis a are formed in the flange portion 33B. The holes 332B can be used as screw holes into which screws for fixing a shaft body on an output side to the flange portion 33B are inserted. In addition, the shaft body on the output side can be inserted into an inner peripheral portion 331B of the flange portion 33B.

As described above, the gear device 1B has the rigid gear 2, which is the "internal gear", the flexible gear 3B, which is the flexible "external gear" that partially meshes with the rigid gear 2, and the wave generator 4, which comes into contact with the flexible gear 3B and moves a position where the rigid gear 2 and the flexible gear 3B are meshed with each other in the circumferential direction. The outer circumferential surface 320 (exterior surface) of the body portion 32 of the flexible gear 3B has the oil-repellent portion 30, of which oil repellency is higher than that of the tooth surface 310 (exterior surface) of the external tooth portion 31.

Also in the third embodiment described above, the spill of the lubricant 60 disposed on the tooth surface 310 of the external tooth portion 31 to the body portion 32 can be reduced.

Such a gear device 1B can also be mounted on the robot 800 which will be described later, in addition to the robot 100.

Fourth Embodiment

Next, a fourth embodiment of the invention will be described.

Figure 11:
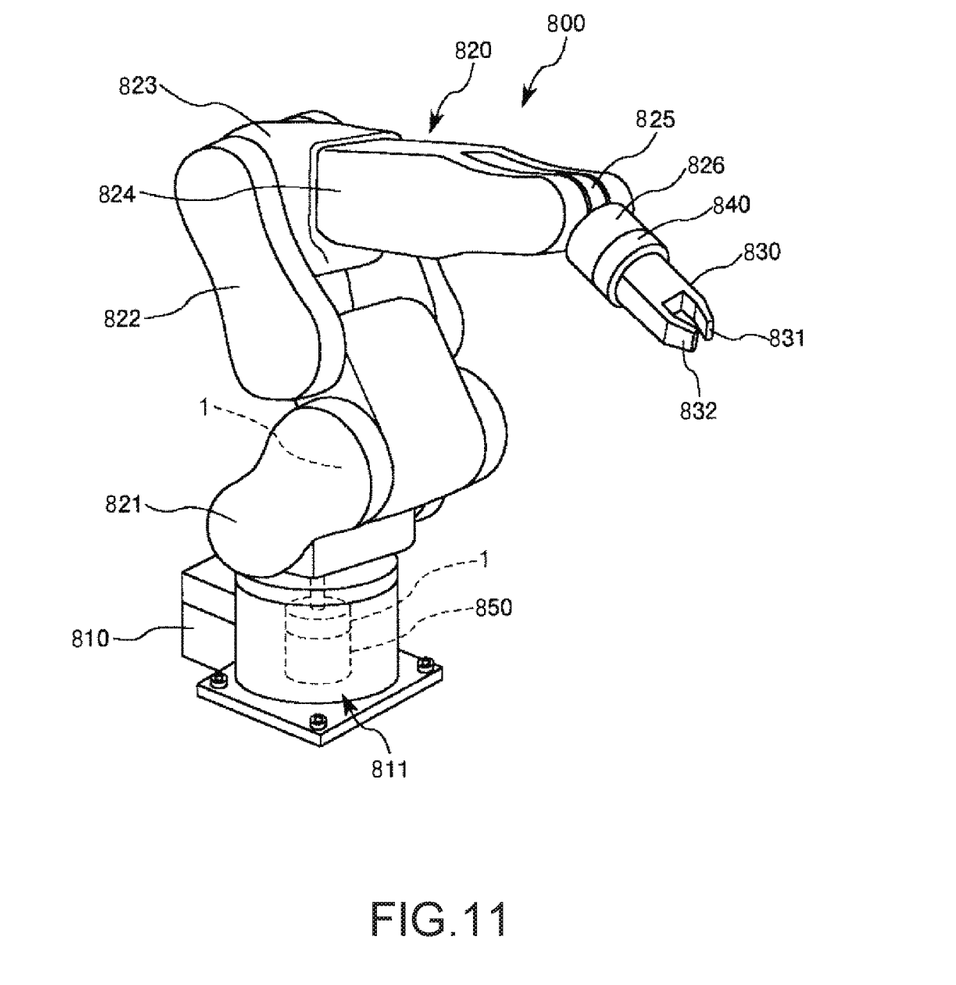
FIG. 11 is a schematic side view of a robot according to a fourth embodiment of the invention.

FIG. 11 is a schematic side view of a robot according to the fourth embodiment of the invention.

In the following description, differences between this embodiment and the first embodiment described above will be mainly described, and the description of the same facts will be omitted.

The robot 800 illustrated in FIG. 11 is a six-axis vertical multi-joint robot, and has a base 811, a robot arm 820 connected to the base 811, and a force detector 840 and a hand 830, which are provided on a tip portion of the robot arm 820. In addition, the robot 800 has a control device 810 that controls a plurality of drive sources (including a motor 850 and the gear device 1) which generate motive power to drive the robot arm 820.

The base 811 is a portion for mounting the robot 800 on any mounting point. The mounting point of the base 811 is not particularly limited, and may include, for example, a floor, a wall, a ceiling, and a movable carriage.

The robot arm 820 has a first arm 821 (arm), a second arm 822 (arm), a third arm 823 (arm), a fourth arm 824 (arm), a fifth arm 825 (arm), and a sixth arm 826 (arm), and the arms are connected in this order from a base end side (base side) to a tip side. The first arm 821 is connected to the base 811. The hand 830 (end effector) that grasps, for example, various types of components is detachably mounted on a tip of the sixth arm 826. The hand 830 has two fingers 831 and 832, and for example, various types of components can be grasped by the fingers 831 and 832.

In the robot 800, the gear device 1 transmits driving force to move the first arm 821 around the base 811 from a base 811 side to a first arm 821 side. At this time, by the gear device 1 functioning as a decelerator, the driving force can be decelerated and the first arm 821 can be moved around the base 811. "Moving around" refers to movement around a certain center point in both directions, including one direction and the opposite direction, and refers to rotating around a certain center point.

As described above, the robot 800 includes the base 811, the first arm 821 provided so as to be movable around the base 811, and the gear device 1 that transmits driving force from one of the base 811 and the first arm 821 to the other. Herein, the base 811 may be considered as the "first member" and the first arm 821 may be considered as the "second member". Alternatively, the base 811 may be considered as the "first member" and any number of arms sequentially selected from the first arm 821 side, out of the second to sixth arms 822 to 826, may be considered as the "second member". That is, it can be said that a structure formed of the first arm 821 and any number of arms sequentially selected from the first arm 821 side, out of the second to sixth arms 822 to 826, is the "second member". For example, it can be said that a structure formed of the first and second arms 821 and 822 is the "second member", or it can be said that the entire robot arm 820 is the "second member". In addition, the "second member" may include the hand 830. That is, it can be said that a structure formed of the robot arm 820 and the hand 830 is the "second member".

Similarly, joint portions of the first arm 821 and the second arm 822 are included in the gear device 1 that transmits driving force from the first arm 821 to the second arm 822. For example, the first arm 821 can be considered as the "first member" and the second arm 822 can be considered as the "second member". In this case, a direction in which the axis a (rotation axis) of the gear device 1 extends changes according to the driving of at least one of the first arm 821 (first member) and the second arm 822 (second member). That is, the posture of the gear device 1 changes according to the driving of at least one of the first arm 821 and the second arm 822. In the robot 800, in which the posture of the gear device 1 changes due to the driving of the first arm 821 or the second arm 822 as described above, the lubricant 60 provided on the external tooth portion 31 is likely to flow in the body portion 32 due to an external force (for example, gravity and a centrifugal force). For this reason, in the robot 800 in which the posture of the gear device 1 changes as described above, providing the oil-repellent portion 30 in the body portion 32 is particularly effective in restricting the spill of the lubricant 60 from the external tooth portion 31 to the body portion 32.

In addition, each of joint portions of the second to sixth arms 822 to 826 may also be included in the gear device 1. In this case, an nth (n is an integer that is equal to or larger than 1) arm may be considered as the "first member", and an (n+1)th arm may be considered as the "second member".

Also in the fourth embodiment described above, the spill of the lubricant 60 disposed on the tooth surface 310 of the external tooth portion 31 to the body portion 32 can be reduced.

Hereinbefore, although the robot, the gear device, and the manufacturing method for a gear device according to the invention have been described based on the embodiments illustrated in the drawings, the invention is not limited thereto, and the configuration of each portion can be replaced with any configuration having the same function. In addition, any other configuration elements may be added to the invention. In addition, each embodiment may be combined as appropriate.

In addition, although a one-armed horizontal multi-joint robot and a one-armed vertical multi-joint robot have been described in the embodiments described above, the invention is not limited thereto insofar as a gear device having a flexible gear is used. For example, a robot may be a two-armed robot. In addition, a robot may have any number of joints.

In addition, the invention is not limited to the wave gear device of the embodiments described above. The invention is applicable to various types of gear devices without being limited to the gear device of the embodiments described above insofar as a configuration, in which an internal gear, an external gear that meshes with the internal gear, and a wave generator are included and an oil-repellent portion is in a body portion of the external gear, is adopted.

The entire disclosure of Japanese Patent Application No. 2016-186602, filed Sep. 26, 2016 is expressly incorporated by reference herein.

What is claimed is:

1. A robot comprising:
    a first member;
    a second member that is provided so as to be movable around the first member; and
    a gear device that transmits driving force from one of the first member and the second member to the other,
    wherein the gear device includes:
        an internal gear having a plurality of internal teeth,
        a flexible external gear that has an external tooth portion that defines a plurality of external teeth that mesh with the internal teeth of the internal gear, and a body portion connected to the external tooth portion in a direction of a rotation axis that does not include any of the external teeth, and
        a wave generator that comes into contact with the external gear and moves a position where the internal gear and the external gear are meshed with each other in a circumferential direction, and
    an exterior surface of the body portion has an oil-repellent portion of which oil repellency is higher than oil repellency of the external teeth such that a lubricating oil between the internal teeth and external teeth is maintained.

2. The robot according to claim 1,
    wherein the oil-repellent portion is provided axially away from the external tooth portion.

3. The robot according to claim 1,
wherein each of the external teeth have a plurality of recessed portions or a plurality of projection portions formed on surfaces thereof.

4. The robot according to claim 1,
wherein the oil-repellent portion is configured of a material including fluorine.

5. The robot according to claim 4,
wherein the exterior surface of the body portion having the oil-repellent portion has a plurality of recessed portions or a plurality of projection portions formed therein.

6. The robot according to claim 1,
wherein the body portion is disposed axially away from the external tooth portion, in the gear device.

7. The robot according to claim 1,
wherein a direction in which the rotation axis of the gear device extends can be changed with driving of at least one of the first member and the second member.

8. The robot according to claim 1,
wherein the gear device has a member having a surface opposing the body portion, and
the surface of the member has a portion of which oil repellency is higher than oil repellency of the exterior surface of the external tooth portion or an exterior surface of the internal gear.

9. A gear device comprising:
an internal gear having a plurality of internal teeth;
a flexible external gear that has an external tooth portion that defines a plurality of external teeth that mesh with the internal teeth of the internal gear, and a body portion connected the external tooth portion in a direction of a rotation axis that does not include any of the external teeth; and
a wave generator that comes into contact with the external gear and moves a position where the internal gear and the external gear are meshed with each other in a circumferential direction,
wherein an exterior surface of the body portion has an oil-repellent portion of which oil repellency is higher than oil repellency of the external teeth such that a lubricating oil between the internal teeth and external teeth is maintained.

10. A manufacturing method for a gear device comprising:
preparing an internal gear having a plurality of internal teeth, a flexible external gear that has an external tooth portion that defines a plurality of external teeth that mesh with the internal teeth of the internal gear, and a body portion connected to the external tooth portion in a direction of a rotation axis, the body portion not including any external teeth, and a wave generator that comes into contact with the external gear and moves a position where the internal gear and the external gear are meshed with each other in a circumferential direction; and
forming an oil-repellent portion, of which oil repellency is higher than oil repellency of the external teeth, on an exterior surface of the body portion such that a lubricating oil between the internal teeth and external teeth is maintained.

* * * * *